United States Patent [19]

Hittner et al.

[11] Patent Number: 5,024,822
[45] Date of Patent: * Jun. 18, 1991

[54] STABILIZATION OF FLUORIDES OF SPENT POTLINING BY CHEMICAL DISPERSION

[75] Inventors: Herman J. Hittner, Lower Burrell, Pa.; Quyen C. Nguyen, Newburgh, Ind.

[73] Assignee: Aluminum Company of America, Pittsburgh, Pa.

[*] Notice: The portion of the term of this patent subsequent to Sep. 11, 2007 has been disclaimed.

[21] Appl. No.: 502,185

[22] Filed: Mar. 30, 1990

Related U.S. Application Data

[63] Continuation-in-part of Ser. No. 174,863, Mar. 29, 1988, Pat. No. 4,956,158.

[51] Int. Cl.$^5$ .............................................. C01F 7/02
[52] U.S. Cl. ..................................... 423/111; 106/705; 106/789; 204/67; 423/115; 423/130; 501/28; 501/128; 501/155
[58] Field of Search .................. 106/103, 117; 204/67; 423/111, 115, 119, 130; 501/28, 125, 128, 155

[56] References Cited

U.S. PATENT DOCUMENTS 4,160,808  7/1979  Andersen et al. ............... 423/119
4,956,158  9/1990  Nguyen et al. .................. 423/111
4,973,464  11/1990 Rickman ......................... 423/119

OTHER PUBLICATIONS

Arkansas Democrat, "Alcoa Uses Plant Near Benton to Burn New York, Wastes," Little Rock, Ark., Oct. 30, 1986.
Ogden Environmental Services, Inc., Phase 2 Development of the Circulating Bed Combustion of Spent Potliners (Sep. 1987), pp. iii to 3–50.

Primary Examiner—Wayne A. Langel
Attorney, Agent, or Firm—Douglas G. Glantz

[57] ABSTRACT

A process for treating spent potlining from the electrolytic smelting of aluminum in cryolite includes incinerating the potlining to combust carbonaceous material to form an ash at a temperature low enough to maintain low fluorine vapor pressures, admixing siliceous material with the potlining either before of after the ash-forming stage, and heating the ash and siliceous material to form a glassy residue.

The residue formed by the process of the present invention produces a spent potlining suitable for landfill characterized by a low leachability of fluorine in water.

24 Claims, 2 Drawing Sheets

PHASE DIAGRAM OF THE Na$_2$O - SiO$_2$ - Al$_2$O$_3$ SYSTEM

LEACHABLE FLUORIDES MEASURED IN SPL PRODUCTS

STABILIZATION OF FLUORIDES OF SPENT POTLINING BY CHEMICAL DISPERSION

CROSS-REFERENCE TO RELATED PATENT APPLICATION

This application is a continuation-in-part application of U.S. Ser. No. 174,863, filed Mar. 29, 1988, now U.S. Pat. No. 4,956,158 issued Sept. 11, 1990.

BACKGROUND OF THE INVENTION

This invention relates to the disposal of spent potlining by incineration and glassification for landfill disposal.

Aluminum is produced commercially by the electrolytic smelting of alumina in an electrolytic bath of fused cryolite. Relatively pure alumina is reduced in the cryolite ($3NaF$—$AlF_3$) in an electrolytic cell (named Hall-Heroult cell after the earliest developers of the electrolytic process for producing aluminum). The reaction is carried out in the Hall-Heroult cell process in an aluminum reduction pot in which alumina is dissolved in the molten cryolite bath. The alumina in solution in the molten cryolite is electrolyzed to form metallic aluminum. Aluminum produced in the reaction is heavier than the electrolyte and forms a molten layer at the bottom of the reduction pot which serves as the cathode of the cell. Carbon anodes extend into the bath, and oxygen liberated at the anode oxidizes carbon on the electrode.

The electrolyte composition is an important factor in the aluminum production process. The electrolyte contains cryolite and fluorspar (calcium fluoride, $CaF_2$). Excess aluminum fluoride is present with dissolved alumina in the electrolyte to reduce the liquidus temperature to the point where the cell can be operated in the range of about 940°–980° C.

Gases are emitted by the batteries of reduction pots in the Hall-Heroult cell process. The emitted gases include carbon dioxide, volatilized fluorides, and gaseous hydrogen fluoride. Particulate solids, including fine alumina, cryolite, carbon, and inorganic compounds are elutriated from the electrolytic bath with the gases. Small amounts of lithium, calcium, silica, iron, sodium sulfate, and magnesium are present also in the gas streams as solid particles.

The reduction cells in the commercial electrolytic potlines are lined with a carbonaceous material. During the life of the cells, the carbonaceous material linings are degraded gradually by penetration of bath materials into the lining, e.g., such as by penetration by metallic aluminum, cryolite, and alumina. In the high temperatures of the electrolytic reduction process, the carbonaceous material ages gradually and degrades over time. Eventually, the unusable or "spent" potlining must be removed and discarded.

It is known that spent potlining from aluminum reduction cell linings contains a significant quantity of carbonaceous material, a mixture of fluoride salts, some low levels of cyanide, and alumina ($Al_2O_3$).

The Environmental Protection Agency is considering classifying spent potlining from the Hall-Heroult cell as a solid waste hazardous material because of the hazardous and solid waste amendments of 1984. Most spent potlining cannot be landfilled because of cyanide content (approximately 1,000 parts per million) and because of its high content of leachable fluoride (3,000 to 8,000 parts per million) from an approximately 18% total fluoride in the spent potlining.

Several methods already have been recommended for the recovery of fluoride salts and alumina content of the spent potlining material. One method involves the pyrohydrolysis of the spent cell material or potlining in a fluidized bed reactor. Pyrohydrolysis involves contacting a fluidized bed of spent potlining with water or steam to react with the fluorine compounds to form hydrogen fluoride. Sodium fluoride and other sodium compounds in the potlining react to form sodium fluoride and sodium oxide vapors. The sodium fluoride and sodium oxide vapors are produced in the pyrohydrolysis reactions.

It is known to use limestone, calcium carbonate, to react with fluoride in the spent potlining at about 700°–780° C. to form a calcium fluoride. However, the final product still has a high level of leachable fluoride. An article in Light Metals, 1981, entitled "Recovery of Fluoride and Fluorine Balance of Aluminum Smelting Plant" describes a process of spent potlining wherein the potlining is crushed, incinerated, and introduced into a crusher for pulverizing and extraction of the fluorides into water. After filtration, the material is introduced into a mixing tank, and sulfuric acid and calcium carbonate are added to produce calcium fluoride. The slurry is desiccated, and the sludge sent to a disposal site. The fluoride-containing filtrate is used as the scrubbing solution in a wet scrubber.

U.S. Pat. No. 4,113,832 discloses a process wherein spent potlining is leached with a caustic solution followed by a precipitation of sodium fluoride by saturating the leach liquor with a compound to suppress the solubility of the sodium fluoride in the leach liquor. The preferred compound is ammonia. The precipitated sodium fluoride is removed, and the leach solution saturated with ammonia is processed to remove the ammonia.

U.S. Pat. No. 4,444,740 discloses a process for removing and recovering fluoride values from spent potlining by leaching with a dilute caustic. The leachate is treated with a calcium compound to precipitate calcium fluoride.

The conventional methods for removing and recovering fluorides from spent potlining are impractical ways to avoid the problem of spent potlining disposal with fluorides and cyanides present. Prior methods adopt the approach of removing and recovering the fluoride. These prior art methods are impractical by reason of the raw material costs assigned to the process and also by reason of the process steps which must be carried out to remove and recover the fluorides.

U.S. Pat. No. 4,735,784 to Davis et al (currently assigned to the Morrison-Knudsen Company, Inc.) discloses a process for treating solid, substantially non-volatile waste contaminated with a heat-sensitive contaminant by decomposing or evolving the contaminants from the melt as a gas. Davis et al disclose a molten slag subjected to cooling, the contaminating compounds bound or encapsulated into a solid glassy slag, and suitable as such for handling fluoride and cyanide contaminated aluminum smelting wastes such as spent potliner material. Silica can be added to such wastes. The Davis et al process produces significant volumes of fluoride emissions. The patent covers a pyrohydrolysis process, disclosed and claimed. The process forms a slag in the presence of sufficient water for pyrohydrolysis conditions resulting in the volatilization of substantially all of the fluoride contaminants, mostly in the form of hydrogen fluoride.

The Davis et al process includes a single heating step in which the mixture of spent potlining and silicates is heated to 1000°-1700° C. Davis et al heat the mixture to the temperature range of 1000°-1700° C. to volatilize substantially all the fluoride in the spent potlining. Steam is used in the process to provide hydrogen to combine with the fluoride to produce hydrogen fluoride. Davis et al trap some fluoride in the glass residue, but only a minor portion of the total fluoride from the spent potlining. As stated in Column 3, lines 30-33, and in the claims of Davis et al, substantially all the fluoride contaminants are volatilized.

It is an object of the present invention to provide a process for eliminating the problem of disposal of spent potlining containing fluorides in such a way to reduce gaseous emissions of fluorine or fluoride in any form.

It is an object of the present invention to provide a practical method for eliminating the problem of disposal of spent potlining containing fluorides.

It is another object of the present invention to provide a practical method for the disposal of spent potlining which reduces degradation of the environment.

These and other objects of the present invention will become apparent from the detailed description which follows.

SUMMARY OF THE INVENTION

The present invention provides a process for treating spent potlining from the electrolytic smelting of aluminum in cryolite including incinerating spent potlining at a temperature low enough to maintain low fluorine vapor pressures and high enough to combust carbonaceous material in the potlining to form an ash, admixing siliceous material with the potlining either before or after the ash-forming stage, and heating the ash and siliceous material to form a glassy residue.

In one aspect, the process of the present invention includes incinerating for sufficient residence time and with sufficient oxygen contact with the carbon to combust a majority of the carbonaceous material, at least about 50% by weight of the carbonaceous material.

In one aspect, the process of the present invention for treating spent potlining from the electrolytic smelting of aluminum in cryolite in a kiln includes providing an ash and siliceous material having a glassy residue sufficiently low in viscosity, thereby permitting flow through the kiln.

In one aspect, the process of the present invention includes incinerating spent potlining by burning the spent potlining to combust the carbon at a temperature low enough to maintain a fluorine vapor pressure lower than about 5 mm Hg, thereby reducing volatilization of fluorides in the potlining, admixing siliceous material with the spent potlining either before or after the ash-forming stage, and heating the ash in the presence of the siliceous material to a temperature high enough to melt the siliceous material and form a molten residue with fluorides dispersed and fixed therein.

In one aspect, the process for treating spent potlining minimizes contact of moisture with the carbon at incinerating temperatures, thereby reducing volatilization of fluorides as hydrogen fluoride gas.

The residue formed by the process of the present invention produces a glassy residue suitable for landfill characterized by a low leachability of fluoride in water.

DETAILED DESCRIPTION

Figure 1:
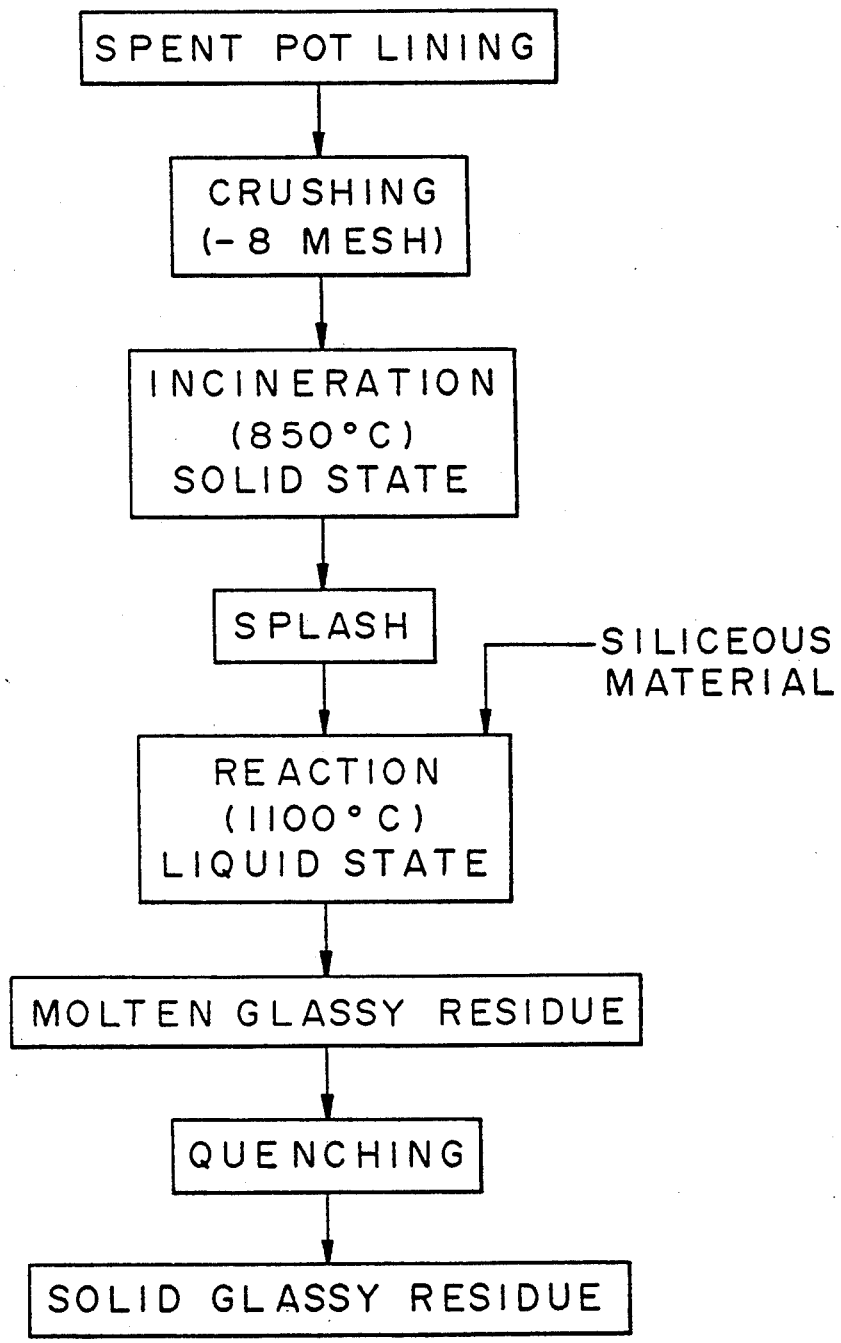
FIG. 1 shows a schematic flow diagram of a process in accordance with the present invention.

The process of the present invention provides a method of destroying cyanides and stabilizing hazardous elements such as fluorides in spent potlining and some other toxic wastes such as chromate sludges. The stabilization consists of dispersing them in a stable sodium silicate network by chemi-dispersion. It has been found that the process in accordance with the present invention provides an unexpectedly low leachability of otherwise hazardous elements, including a leachability of fluorides at a level less than about 25 mm per liter.

It has been found that siliceous material is an efficient reactant to stabilize fluorides in spent potlining in a silicon network. A chemi-dispersion technique favors the formation of the stable chemical bonding (Si—F) between silicon and fluorine atoms.

The process of the present invention requires two heating stages or steps, a first one to burn the carbon and a second one to melt the siliceous material, thereby producing an ash and siliceous material having much of the fluorides formed into a glassy residue suitable for landfill. Applicants' process requires such two heating stages for burning spent potlining to avoid vaporizing or volatilizing the fluorine content of the spent potlining.

In the first stage of the two-stage heating process, spent potlining is burned to form an ash at a temperature low enough to maintain a low fluorine vapor pressure. The first stage of the two-stage heating process operates to avoid volatilizing the fluorides. The temperature of Applicant's first stage and the residence time of the first stage is selected to maintain a low fluorine vapor pressure and to burn a majority of the carbon, i.e., more than about 50% by weight of the carbon in the spent potlining. The requirement for burning a majority of the carbon in the spent potlining is desirable for the reason that otherwise the subsequent carbon and siliceous material can react to foul or agglomerate to cause problems in the handling or flow of the material in the kiln. By kiln is meant heater or other heating reactor whether batch or continuously operated.

The residence time of the first stage of the two-stage heating process of the present invention is determined by the particular reactor configuration and requirement for contacting the spent potlining with oxygen. It is important to provide sufficient residence time and sufficient oxyge contact with the carbon to combust a majority of the carbonaceous material. By majority is meant at least about 50% by weight of the carbonaceous material. In one aspect, the process of the present invention is carried out to combust at least about 55% by weight of the carbonaceous material, and more preferably about 70% by weight of the carbonaceous material.

The temperature of the first stage of the two-stage heating process of the present invention is selected to maintain a low fluorine vapor pressure and yet be high enough to burn a majority of the carbon. In one aspect, the process of the present invention is carried out by incinerating or burning the potlining at a temperature in the range of about 800°-850° C.

The first stage of the two-stage heating process of the present invention requires an incinerating stage to combust carbon to burn carbon to sufficient levels at a low fluorine vapor pressure. The low fluorine vapor pressure produces minimal volatilization of the fluorides in the potlining. By low fluorine vapor pressures, in a quantifiable sense, is meant lower than about 5 mm Hg. The low fluorine vapor pressure can be further characterized as lower than about 2 m Hg, preferably lower than about 1 mm Hg and most preferably lower than about 0.08 mm Hg.

In one aspect, the process of the present invention is carried out by minimizing contact of moisture with the carbon at the elevated temperatures employed in incinerating or melting in the two-stage heating process of the present invention. Minimizing the contact with moisture reduces volatilization of fluorides as hydrogen fluoride gas. The process of the present invention minimizes moisture and preferably holds th moisture amount in a quantified level lower than about 10% by weight of the material in the kiln, more preferably lower than about 3% by weight of the material in the kiln.

The process of the present invention in one aspect requires incinerating to combust a majority of the carbonaceous material in the potlining such that when siliceous material is added to the ash and the mixture is heated in the second stag of the two-stage heating process to a temperature high enough to make a glassy residue that the material can flow and be handled efficiently in the reactor. One way of quantifying the parameter of handling the material in the reactor would be to specify a viscosity of the glassy residue formed in the second stage of the two-stage heating process of less than about $7 \times 10^2$ poises, preferably less than about $6 \times 10^2$ poises, more preferably less than about $2 \times 10^2$ poises, and most preferably less than about $1.5 \times 10^2$ poises.

In the two-stage heating process of the present invention, spent potlining can be heated and formed into a glassy residue suitable for landfill with little, if any, volatilization of the fluorides in the spent potlining feed to the process. By burning out the carbon at a low temperature, the process of the present invention minimizes the volatilization of the fluoride when the ash is subsequently heated to a temperature that normally would volatilize the fluoride to significant levels.

The residence time requirement can be modified by changing reactor configuration and particle sizes of the feed materials, e.g., by crushing and sizing spent potlining to particle sizes small enough to expose the carbonaceous materials to sufficient oxygen for the combustion in the incinerating stage.

A schematic flow diagram of the process of the present invention is depicted in FIG. 1. Referring now to the flow diagram, spent potlining from a Hall-Heroult cell for the electrolytic smelting of aluminum is fed to the crushing stage where the potlining is crushed and sized to a specified particle size, e.g., such as less than about 8 mesh Tyler Series. The crushing stage can be performed using a common technique such as a jaw crusher as would be known to one of ordinary skill in the art, and requires low levels of energy.

The crushed and sized particles of spent potlining are passed to the incineration stage which is carried out by heating the spent potlining in the solid-state to form an ash at a relatively low temperature. By relatively low temperature is meant low enough to reduce fluorine gaseous emission while high enough to combust carbon, e.g., in the range of about 800°-850° C. to achieve the objective of burning cyanides and carbonaceous materials to form an ash. Ash from the incineration stage with siliceous material is heated in the second stage of the two-stage heating process of the present invention to form a liquid mixture. The siliceous material optionally may be added prior to the ash-forming stage. The second heating stage will require heating to a temperature in a range, preferably above about 1100° C.

The process in accordance with the present invention preferably provides the ash and siliceous mixture formulated in specific proportions, i.e., in the amount of at least 1.4 molar ratio of silicon to sodium. The specified proportion has been found from an empirical investigation. The product forms a molten residue which preferably is quenched rapidly to form a solid residue.

The incineration stage performed immediately after the crushing stage is carried out by burning the crushed and sized spent potlining at a temperature to maintain a low fluorine vapor pressure. The incineration temperature can be specified in the range of about 800°-850° C. to burn the carbonaceous material and still maintain low fluorine emissions. In one aspect, the process of the present invention performs the incineration stage by burning low levels of cyanide in spent potlining in a counter-current flow reactor.

An auxiliary part of the process of the present invention involves determining the sodium content of ash formed in the incineration stage. The sodium content is determined analytically by atomic absorption spectroscopy or any other analytical method such as wet chemistry.

The second heating stage is carried out at a temperature of at least about 1100° C.

The siliceous material added into the reaction stage can be provided by natural siliceous materials such as sand, volcanic rocks, basalt, or by artificial siliceous materials including slags from a blast furnace, glass culets, or the like. The siliceous material should avoid using a silicon oxide having a high crystallinity to eliminate the need for a high temperature for fusing the mixture in the reaction stage. In this regard, siliceous material having a high crystallinity, e.g., such as characteristic of quartz, should be limited to less than about 10% of the siliceous material added into the reaction mixture. Otherwise, in one aspect, the ratio of siliceous material to spent potlining optionally may be increased to a molar ratio higher than at least about 1.4 silicon to sodium.

The molten glassy residue formed in the second heating stage optionally can be cooled rapidly. In one aspect, the residue can be cooled to a solid glassy residue by water quench.

The solid glassy residue produced by the process of the present invention is characterized by low leachability of fluorine and water. By the low leachability is meant less than about 100 parts per million fluorine, preferably less than about 50 parts per million fluorine. It has been found that leachability of less than about 24 ppm fluorine is achievable by the process of the present invention. The low leachability of the product produced by the process of the present invention is important to satisfy the requirements of landfill disposal of the spent potlining. Otherwise, rain water in contact with the spent potlining disposed in the landfill would leach out the fluorine and create hazardous liquid in the landfill and unacceptable environmental degradation.

The process of the present invention can be described as a chemi-dispersion technique to offer the very low leachability of fluorides. Analytical techniques including X-ray Diffraction Spectroscopy, X-ray Fluorescent Spectroscopy, and Fourier Transform Infrared Spectroscopy indicate that the chemical bonding between silicon and fluorine atoms in the products form a Si—F covalent bond having a bond strength of about 135 Kcal per mole. The covalent bond of high bond strength make the fluoride stable in the silicate structure in the solid glassy residue product of the process of the present invention. On a macroscopic scale, the covalent bonding produced in the present invention translates into a low fluoride leachability even when the total leaching surface area of the crushed material is increased significantly.

In addition to fluoride scavenger function, the sodium disilicate systems also serve as a high temperature dispersion agent for other mineral compounds during the fluoride stabilization process. Some minerals were originally present in spent potlining such as calcium fluoride, sodium aluminate. Other wastes such as chromium sludge waste, non-useable lubricant oil filter cake, and contaminated cast iron can be stabilized with the process. It has been found that the chromium complex, by way of example, has been fully stabilized in the silicate network and the product obtained from the process of the present invention.

Figure 2:
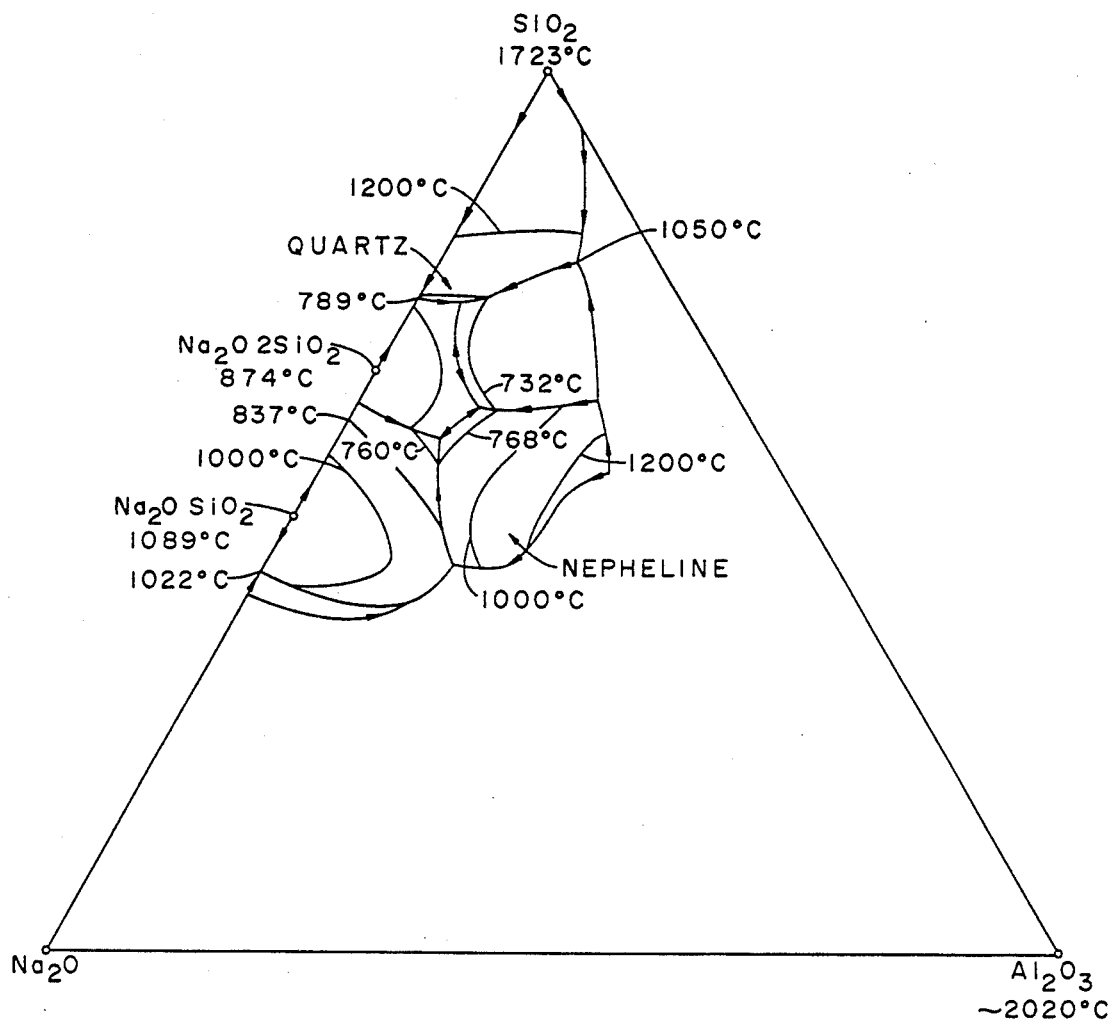
FIG. 2 provides a phase diagram of the $Na_2O$—$SiO_2$—$Al_2O_3$ system.

The 1.4:1 ratio of Na to Si in the process of the present invention has been found empirically. A theoretical approach would have suggested a lower molar ratio of silicon to sodium. A phase diagram of the $Na_2O$—$SiO_2$—$Al_2O_3$ system is depicted in FIG. 2. The phase diagram indicates that the compositions close to sodium disilicate ($Na_2O.2SiO_2$) have low melting points, e.g., such as about 800° C. In this regard, one would have added a silicon material to the spent potlining mixture based on a theoretical molar ratio of silicon to sodium at or about 1:1 to form silicon disilicate systems. Besides sodium, other constituents of spent potlining were viewed as a whole entity in a ternary system of $Na_2O.2SiO_2.X$. Such a system is available in published literature only when some of the X component was a pure compound.

Figure 3:
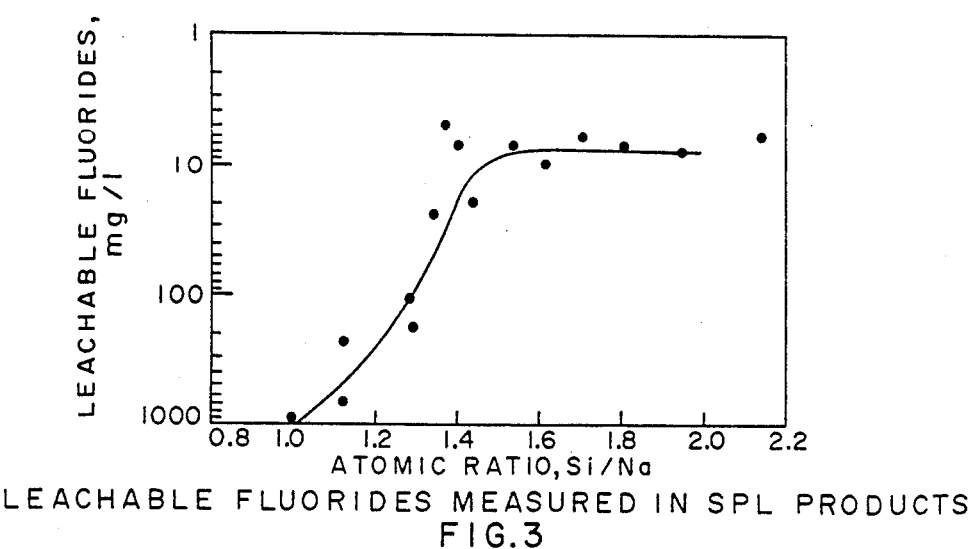
FIG. 3 presents a graphical illustration of the empirical results obtained by the process of the present invention.

However, it has been found empirically that a threshold ratio of siliceous material to sodium should be admixed at least about 1.4:1 molar ratio of silicon to sodium. Referring now to FIG. 3, a graphical illustration is depicted of leachable fluorides concentration per molar ratio of silicon to sodium. It has been found that leachable fluorides are significantly reduced at molar ratios above about 1.4. For this reason, the process of the present invention with a minimum molar ratio of silicon to sodium of about 1.4:1 provides an unexpectedly low fluoride leachability in the solid glassy residue product of the present invention.

The incineration stage is performed at a temperature of about 825° C.±25° C. without additives, so that fluoride emissions are observed to be insignificant. The incineration stage operating on a −8 mesh Tyler Series particle size of spent potlining is carried out at about 825° C. with a residence time of three to four hours. Very large-scale operations are performed with less residence time, e.g., on the order of about one hour through a kiln. However, the residence time should be viewed not as absolute time terms in so many minutes or hours, but rather in functional terms to provide sufficient residence time and oxygen contact with the carbon to combust a majority of the carbonaceous material in the potlining. Spent potlining particles are very dense. The particles should be small enough to expose the carbonaceous materials to sufficient oxygen for combustion. The burning temperature should not exceed 880° C. to avoid melting cryolite bath. Otherwise, higher temperatures unexpectedly are detrimental to carbon combustion.

The second heating stage of the two-stage process of the present invention is carried out to dissolve and to disperse all mineral impurities including fluorides in the liquid slag. The liquid $Na_2O.2SiO_2$ system provides a low melting point, e.g., such as about 800° C. and a high capability to dissolve other minerals. Sodium content in the spent potlining is high enough to react with siliceous material, e.g., in the form of sand, to achieve a $Na_2O.2SiO_2$ liquid phase. Sodium oxalate from industrial bauxite extraction residue also can be added to the molten sodium silicate if the slag is low in sodium content.

The process of the present invention can be characterized as a "dry burning" process. "Dry burning" is not intended to mean the absence of water, i.e., the process can have water at lower temperature but most of it will be evaporated or driven off before the carbon is incinerated. The process contemplates that no water will be added at higher temperature as in the addition of significant volumes of steam in the pyrohydrolysis to provide the hydrogen to combine with fluorine to produce hydrogen fluoride gas emissions. Operating costs of the present invention are lower because the "dry burning" process requires only a low grade siliceous material, e.g., sand with impurities permissible such as iron, calcium, and magnesium. The spent potlining can be crushed and ground using a common technique such as a jaw crusher which requires low levels of energy and relatively low costs. The incineration stage to form the ash from the crushed and sized spent potlining requires low levels of supplemental energy because the carbon of the spent potlining is burned and contributes a fuel value to the incineration stage. The second heating stage carried out to achieve stabilization of fluorides in the silicon network requires low levels of energy because the second heating stage does not absorb heat substantially, but only requires sufficient energy of fusion to melt the siliceous material. The process of the present invention does require process control management practices to schedule the treatment of raw materials to carry out the process efficiently. The process also requires monitoring of the product to ensure environmental specifications are achieved.

The molten glassy residue of the present invention optionally can be cooled rapidly to avoid the devitrification that favors the formation of soluble fluorides in the product, especially sodium fluoride. The rapid cooling provides a controlled freezing action to maintain a meta-stable structure in which the fluorine atoms are attached to the silicate network. The existence of this amorphous phase has been found and substantiated by X-ray Diffraction Spectroscopy. The confirmation of the existence of the chemical bonding of Si—F has been found and confirmed by Fourier Transform Infrared Spectroscopy.

While the invention has been described in terms of preferred embodiments, the claims appended hereto are intended to encompass all embodiments which fall within the spirit of the invention.

What is claimed is:

1. A process for treating spent potlining from the electrolytic smelting of aluminum comprising:
    (a) incinerating spent potlinking at a temperature low enough to maintain a fluorine vapor pressure lower than about 5 mm Hg and high enough to combust carbonaceous material in the potlining to form an ash;
    (b) admixing siliceous material with said potlining either before or after said ash-forming step; and
    (c) heating said ash and siliceous material to form a glassy residue suitable for landfill.

2. The process of claim 1 wherein said incinerating comprises incinerating for sufficient residence time and with sufficient oxygen contact with the carbon to combust a majority of said carbonaceous material.

3. The process of claim 1 wherein said incinerating comprises incinerating with sufficient residence time and with sufficient oxygen contact with the carbon to combust at least about 50% by weight of said carbonaceous material.

4. The process of claim 3 wherein said incinerating comprises incinerating for sufficient residence time and with sufficient oxygen contact with the carbon to combust at least about 55% by weight of said carbonaceous material.

5. The process of claim 4 wherein said incinerating comprises incinerating with sufficient residence time and with sufficient oxygen contact with the carbon to combust at least about 70% by weight of said carbonaceous material.

6. A process for treating spent potlining from the electrolytic smelting of aluminum in cryolite in a kiln comprising the steps of:
    (a) incinerating spent potlining in a kiln, at a temperature low enough to maintain a fluorine vapor pressure lower than about 5 mm Hg, to combust carbonaceous material in the potlining to form an ash;
    (b) admixing siliceous material with said potlining either before or after said ash-forming step;
    (c) heating said ash and siliceous material to form a glassy residue suitable for landfill;
    (d) said ash and siliceous material having a glassy residue viscosity of less than about $7 \times 10^2$ poises, thereby permitting flow through the kiln.

7. The process of claim 6 wherein said incinerating comprises incinerating with sufficient residence time and with sufficient oxygen contact with the carbon to combust a majority of said carbonaceous material and said glassy residue viscosity is less than about $6 \times 10^2$ poises.

8. The process of claim 6 wherein said incinerating comprises incinerating with sufficient residence time and with sufficient oxygen contact with the carbon to combust at least about 50% by weight of said carbonaceous material and said glassy residue viscosity is less than about $6 \times 10^2$ poises.

9. The process of claim 8 wherein said incinerating comprises incinerating with sufficient residence time and with sufficient oxygen contact with the carbon to combust at least about 55% by weight of said carbonaceous material and said glassy residue viscosity is less than about $2 \times 10^2$ poises.

10. The process of claim 9 wherein said incinerating comprises incinerating with sufficient residence time and with sufficient oxygen contact with the carbon to combust at least about 70% by weight of said carbonaceous material and said glassy residue viscosity is less than about $1.5 \times 10^2$ poises.

11. A process for treating spent potlining having carbon and fluoride contents comprising the steps of:
    (a) incinerating spent potlining by burning the spent potlining to combust said carbon at a temperature low enough to maintain a fluorine vapor pressure lower than about 5 mm Hg, thereby reducing volatilization of fluorides in the potlining;
    (b) admixing siliceous material with the spent potlining either before or after said ash-forming step; and
    (c) heating said ash in the presence of said siliceous material to a temperature high enough to melt the siliceous material and form a molten residue with fluorides dispersed and fixed therein.

12. A process as set forth in claim 11 wherein said fluorine vapor pressure is lower than about 2 mm Hg.

13. A process as set forth in claim 12 wherein said fluorine vapor pressure is lower than about 1 m Hg.

14. A process as set forth in claim 13 wherein said fluorine vapor pressure is at or lower than about 0.08 mm Hg.

15. A process for treating spent potlining which includes carbon and fluoride comprising the steps of:
    (a) incinerating spent potlining by burning the spent potlining at a temperature of about 800°–850° C. for sufficient time and with sufficient oxygen contact with the carbon to form an ash;
    (b) admixing siliceous material with the spent potlining either before or after said ash-forming step; and
    (c) heating said ash in the presence of said siliceous material to a temperature high enough to melt the siliceous material and form a molten residue with fluorides from the ash dispersed and fixed therein.

16. The process of claim 15 wherein a majority of said carbon is incinerated to said ash.

17. The process of claim 15 wherein at least about 50% by weight of said carbon is incinerated to form said ash.

18. The process of claim 17 wherein at least about 55% by weight of said carbon is incinerated to form said ash.

19. The process of claim 18 wherein at least about 70% by weight of said carbon is incinerated to form said ash.

20. A process for treating potlining which includes carbon and fluoride comprising the steps of:
    (a) incinerating potlining which includes carbon and fluoride in an incinerator by burning the spent potlining to form an ash while minimizing contact of moisture with carbon at incinerating temperatures and thereby reducing volatilization of fluorides as hydrogen fluoride gas;
    (b) admixing siliceous material with the spent potlining either before or after said ash-forming step; and
    (c) heating said ash in the presence of said siliceous material to a temperature of about 1100° C. to melt the siliceous material and ash mixture to form a molten residue to increase fixation of fluoride values in the residue.

21. The process of claim 20 wherein moisture is held below about 10% by weight of material in the incinerator.

22. The process of claim 21 wherein said moisture is held below about 3% by weight of material in the incinerator.

23. A process for treating spent potlining which includes carbon and fluoride comprising the steps of:

(a) incinerating spent potlining by burning the spent potlining at a temperature of about 800°-850° C. for sufficient time and at sufficient oxygen contact to form an ash while maintaining a fluorine vapor pressure lower than about 5 mm Hg and thereby reducing volatilization of fluorides in the potlining, said ash being capable of molten handling at temperatures higher than about 1100° C.;

(b) admixing siliceous material with the spent potlining either before or after said ash-forming step; and (c) heating said ash in the presence of said siliceous material to a temperature of at least about 1100° C. to melt the siliceous material and form a molten residue with fluorides from the ash dispersed and fixed therein suitable for landfill having low leachability of fluoride.

24. A process for treating spent potlining from the electrolytic smelting of aluminum comprising:

(a) crushing and sizing spent potlining containing cyanides and fluorides;

(b) incinerating said spent potlining at a temperature low enough to maintain a low fluorine vapor pressure less than about 5 mm Hg and low fluorine gas emissions;

(c) controlling said crushing to produce particle sizes small enough to expose carbonaceous materials to sufficient oxygen contact for at least about 50% combustion in said incinerating step (b) to form an ash capable of fluidized handling at temperatures of at least about 1100° C., said ash containing fluorides dispersed and fixed therein; and (d) heating said mixture to a temperature of about 1100° C. to form a glassy residue, characterized by a low leachability of fluorine in water, which is suitable for landfill.

* * * * *

UNITED STATES PATENT AND TRADEMARK OFFICE
CERTIFICATE OF CORRECTION

PATENT NO. : 5,024,822
DATED : June 18, 1991
INVENTOR(S) : Herman J. Hittner et al It is certified that error appears in the above-identified patent and that said Letters Patent is hereby corrected as shown below:

| | |
|---|---|
| On the title page under OTHER PUBLICATIONS | Change "New York," to --New York--. |
| Col. 4, line 57 | Change "oxyge" to --oxygen--. |
| Col. 5, line 11 | Change "2 m Hg" to --2 mm Hg--. |
| Col. 5, line 21 | Change "th" to --the--. |
| Col. 5, line 29 | After "second" change "stag" to --stage--. |
| Claim 1, Col. 9, line 4 | Change "potlinking" to --potlining--. |
| Claim 13, Col. 10, line 19 | Change "1 m Hg" to --1 mm Hg--. |

Signed and Sealed this

Twentieth Day of October, 1992

Attest:

DOUGLAS B. COMER

Attesting Officer

Acting Commissioner of Patents and Trademarks